United States Patent Office 3,091,762
Patented May 28, 1963

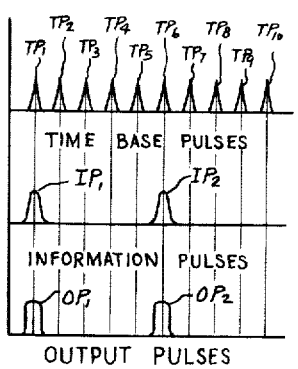
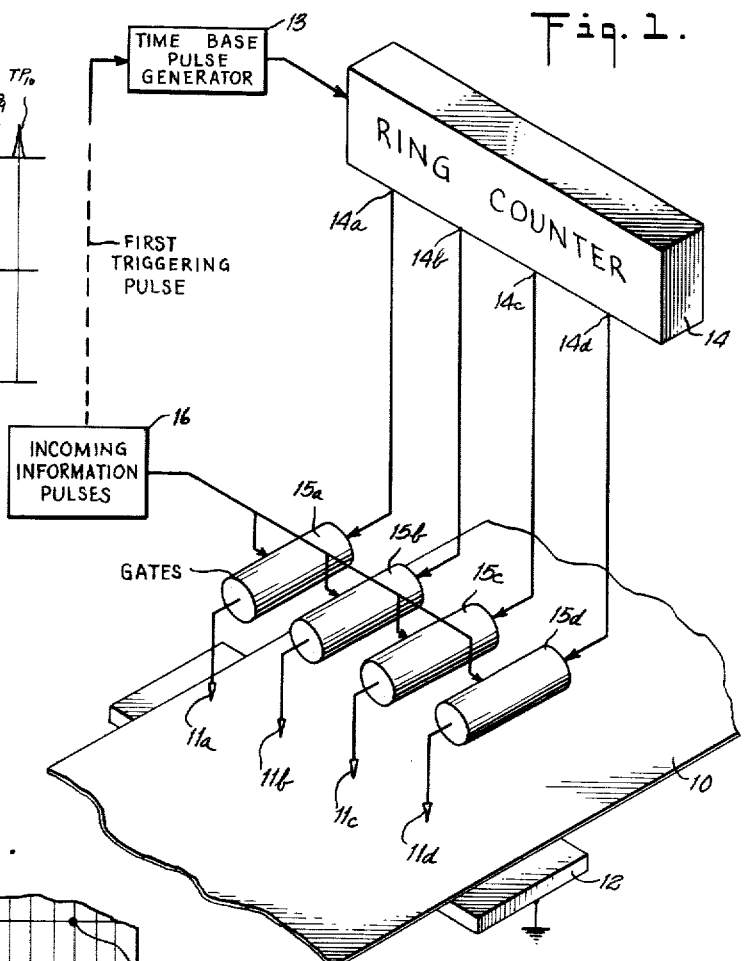
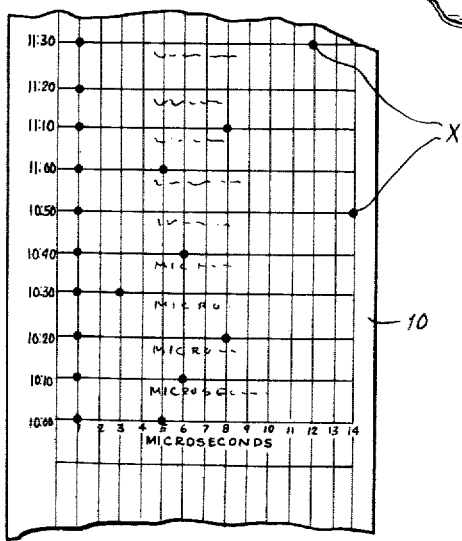
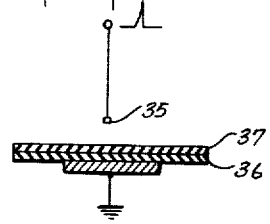

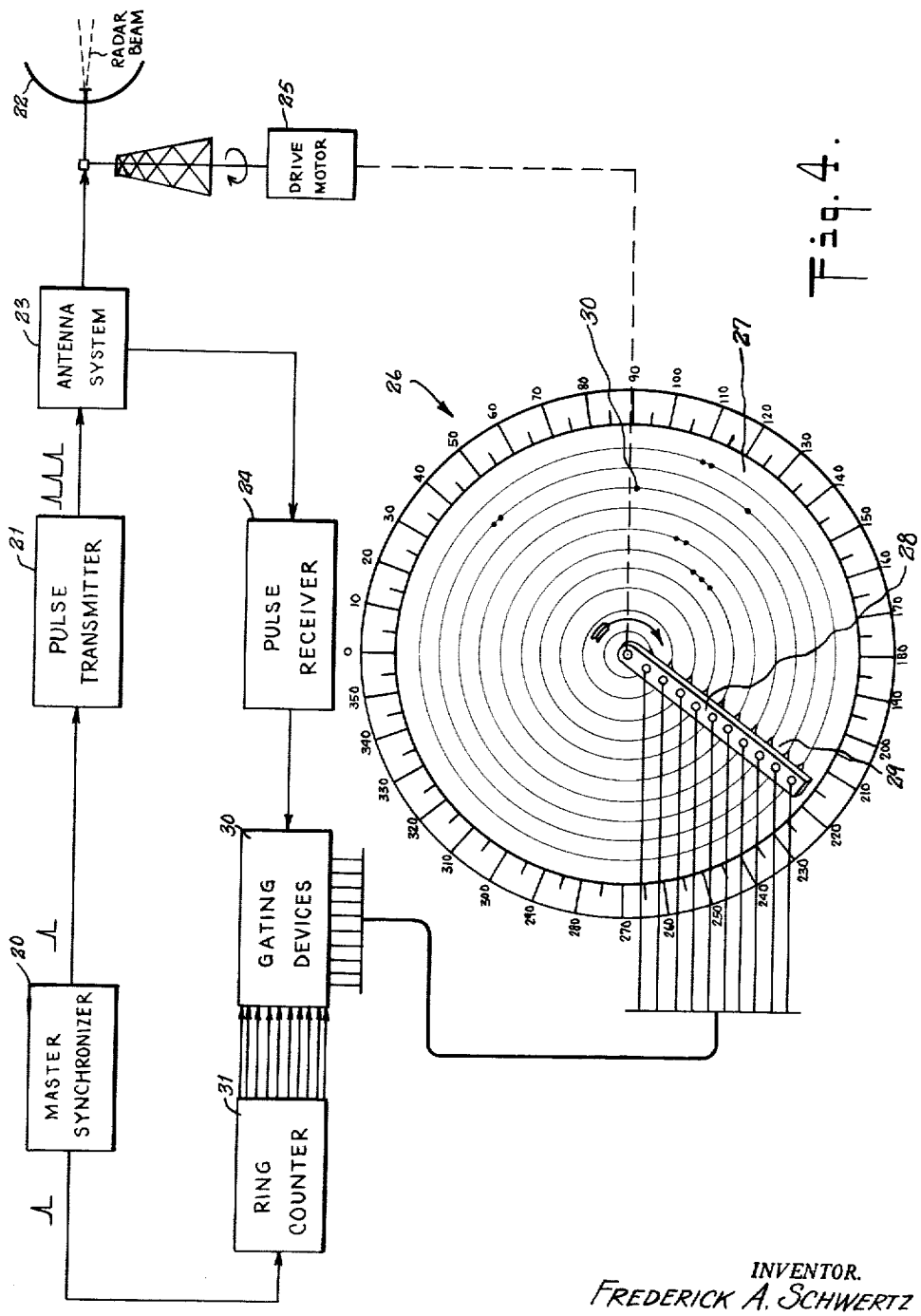

3,091,762
ELECTROSTATIC APPARATUS FOR MEASURING AND RECORDING TIME INTERVALS
Frederick A. Schwertz, Pittsford, N.Y., assignor to Xerox Corporation, a corporation of New York
Filed Feb. 4, 1957, Ser. No. 638,009
10 Claims. (Cl. 343—11)

The present invention pertains generally to electrostatic measuring and recording techniques and more particularly to electrostatic apparatus adapted to indicate and record extremely short intervals of time.

The time interval transpiring between two successive events, as represented by pulses, is the basis for many measurements. Observations of distance are in some instances based on the reception of two types of pulses having different velocities whereby the time difference in reception is a measure of distance. For example, lightning and thunder phenomena produce light and sound waves originating in simultaneous pulses and traveling over the same distance. Since only the sound wave is appreciably delayed, the computation of distance may be predicated on the velocity of sound in air, the light pulse providing a point of zero reference. Similarly, the distance between the site of an explosion and an observation point may be determined by the time difference between the light and sound pulses emanating from the explosion.

Different types of waves may be generated in the same medium as in the case of an earthquake in which longitudinal and transverse compressional waves having different known velocities are produced, the computation of distance being determined by differences in travel time.

In radio navigational systems, such as loran or shoran, pulses are transmitted to an observer from widely spaced points, the pulses being carefully synchronized in time. The time difference in their reception by radio waves makes possible precise computation of the differential distance relative to each pair of spaced points and such observation on two different pairs serves to fix the geographic position of the receiver. Radar systems utilize a short pulse of radio energy which is transmitted toward an object and reflected back to a receiver, the round trip time at the known radio velocity affording an index to the distance.

Thus, in all of the above-described systems, the time which elapses between two events, as represented by pulses, is the key to the desired measurement. When the time interval to be measured is extremely short, in the order of microseconds, the only feasible way heretofore known by which the information could be displayed and measured was by means of a cathode-ray oscilloscope. In such devices, the two pulses are traced along a time base on a luminescent screen, the spacing between the pulses being proportional to the elapsed time therebetween.

Should a permanent record be required of the pulse information exhibited on the cathode-ray screen, it would be necessary to photograph the display. This presents a difficult problem when the pulses are transistory in nature, as with lightning phenomena, rather than repetitive as with radar. Moreover, should it be desired to maintain a continuing record of such pulse information, the photographic recording technique becomes very costly.

Such continuing records are of value for instance in connection with plan-position-indication (PPI) radar systems at an airport terminal wherein all planes within a given radius are indicated in polar coordinates on a phosphorescent screen. A continuing PPI record would furnish a permanent log of traffic activity at the airport, but the cost of present photographic techniques for this purpose is prohibitive. Similarly in maritime radar installations, a continuing record would be highly useful, particularly in the event of a mishap. Such records would be of great assistance in placing responsibility for an accident.

In view of the foregoing, it is the principal object of the present invention to provide electrostatic apparatus adapted to measure and record extremely short intervals of time.

Also an object of the invention is to provide electrostatic recording apparatus, substantially free of inertia, for recording pulse information in the form of electrostatic charge deposits on an insulating medium, the physical position of the charge deposits on the medium being determined by the time positions of the pulses.

More particularly, it is an object of this invention to provide electrostatic recording apparatus for a radar system which dispenses with the need for a cathode-ray indicator and associated photographic reproducing means.

A further object of the invention is to provide an electrostatic recording technique in which the information is directly recorded on the insulating web without the need for subsequent development. A significant aspect of this invention resides in the fact that the electrostatic discharge process is used to trigger a solid state reaction which renders a specially prepared paper self-developable.

Briefly stated in an electrostatic measuring and recording technique in accordance with the invention an array of point electrodes is provided disposed in serial arrangement along a stationary insulating medium. Time base pulses are supplied in sequence to the electrodes through gating devices. Also supplied to the gating devices are input information pulses such that the only gates which are activated are those in which the information pulses and timing pulses are coincident. An activated gate applies an operating pulse to the associated electrode in the array, thereby effecting a field discharge to deposit an electrostatic charge on the insulating medium, the position of the charge being determined by the time position of the information pulse. Thus the time interval between successive information pulses is indicated on the insulating medium by two spaced dots, the distance between the dots being directly proportional to the elapsed time.

For a better understanding of the invention as well as other objects and further features thereof, reference is had to the following detailed description thereof to be read in conjunction with the accompanying drawing wherein:

FIG. 1 is a perspective view of an electrostatic apparatus in accordance with the invention.

FIG. 2 is a pulse graph representative of the operation of the device in FIG. 1.

FIG. 3 is a sample chart as recorded by the device in FIG. 1.

FIG. 4 is a schematic diagram of a PPI radar recording system in accordance with the invention.

FIG. 5 is a sectional view of a treated web in accordance with the invention, which web is self-developable.

Referring now to FIG. 1, there is shown an electrostatic apparatus for recording extremely short time intervals on an insulating web 10 without any physical displacement of the web. Above web 10 there is supported an array of point electrodes 11a, 11b, 11c, and 11d, while below the web a grounded metal plane 12 is provided in parallel alignment with the point electrode array. The electrodes are serially aligned in a transverse path across the web.

Web 10 is formed of any dielectric substance having a sufficiently high resistance under conditions of use as to hold an electrostatic image for a period which permits subsequent utilization of the image by transfer to another surface or by development. Among the web materials which are suitable for this purpose are polyethylene, cellulose acetate or terephthalate films and plastic coated papers.

In accordance with the invention, a pulse applied between a point electrode $11a$ to $11d$ and the ground plane 12 causes an electrostatic image of the point to appear on the insulating web. Depending on the polarity of the applied pulse, the electrostatic image is either positively or negatively charged. In either event the image may be rendered visible by cascading over it an oppositely charged pigment or plastic powder, called a toner.

Incoming time-base pulses from a pulse generator 13 are supplied at a uniform rate to a ring counter of conventional design having a plurality of stages $14a$, $14b$, $14c$, $14d$ arranged in cascade relation. The stages of the counter are connected to one input of the dual-input gating amplifiers $15a$, $15b$, $15c$ and $15d$, respectively. The outputs of the amplifiers are connected to the point electrodes $11a$ to $11d$, respectively. Incoming pulse information for a source 16 is supplied simultaneously to the other input of the several gating amplifiers. Gating amplifiers $15a$ to $15d$ are designed to be activated only when pulses applied to both pulses are coincident therein.

Counter 14 supplies timing pulses in sequence to one input of the gating amplifiers $15a$ to $15d$ connected to corresponding lettered electrodes $11a$ to $11d$. The gating amplifiers each emit an output pulse only when both inputs thereto are simultaneously excited, the resultant output pulse being amplified and applied to the particular electrode to which the gate is connected.

To understand the operation of the device, let us first assume the absence of information pulses. In this condition even though timing pulses from the ring counter are sequentially applied to the gating amplifiers, none of the amplifiers will yield an output pulse. However, should an information pulse appear in the course of the operation of the ring counter, that gating amplifier will be actuated in which the information and timing pulses are coincident.

If two information pulses are successively received within a single counting cycle (equal to the length of time base) two electrodes will be activated, and the distance between these two will give the desired time interval. For example, let us assume that timing pulses are sequentially applied to the four gating amplifiers at uniform intervals and that information pulses are applied which cause actuation of the second and fourth gates, thereby causing the formation of point charges therebelow. This would indicate a time separation between pulses equal to two timing intervals.

In practice, the first pulse may be used to trigger the operation of time base generator 13 for the ring counter 14, so that this information pulse would be recorded at the first electrode, the second pulse being recorded at a subsequent electrode in the array. While four point electrodes have been illustrated, a far greater number may be used in conjunction with a like number of counter stages and gating amplifiers. In this manner a greater number of time increments may be provided. The pulse generator for activating the counter may have variable repetition rate so that the time base may be shortened or lengthened at will.

For example, as shown in FIG. 2, assuming a device with 10 electrodes, timing pulses $TP_1$ to $TP_{10}$ will be applied sequentially at uniform intervals of time to a like number of gates, information pulses $IP_1$ and $IP_2$ are applied simultaneously to the gates at time positions corresponding to the timing pulses $TP_1$ and $TP_6$ to produce output pulses $OP_1$ and $OP_2$ which are applied to the corresponding electrodes to effect a field discharge. Assuming that the known interval between the successive timing pulses is one microsecond, then the time spacing between the information pulses $IP_1$ and $IP_2$ is five microseconds.

As pointed out previously, the web 10 is maintained stationary while the information is being recorded. In practice, after each recording cycle, the web may be shifted to place a fresh surface under the point electrodes for a second recording operation. This shift may be carried out in a stepwise manner at a given rate and the recording web may be provided with graph lines, as shown in FIG. 3, calibrated transversely in microseconds, or other indicia. The web may be longitudinally calibrated in terms of the time increments at which recording takes place. Thus the web, when developed and fixed will contain dots X whose position relative to a zero or reference line is indicative of the time interval being measured.

After the web 10 is electrostatically charged with data to be recorded, it may be removed from the electrode structure and developed and fixed in the manner customary in the xerographic art. Development is accomplished by the deposition and finely divided powder on the surface of the web, the powder adhering to the charged areas. Thereafter the charge pattern is fixed by fusing the powder on the surface of a print to which the powdered pattern has been transferred. A detailed description of the xerographic development and fusing technique and the apparatus involved therein may be found in the Carlson Patent No. 2,297,691.

A charge pattern is formed on the insulating web when a field discharge is produced in the air gap between the insulating medium and the pulsed electrode. The nature of the field discharge is such that when critical stress is attained, ions which normally are present in the gap are accelerated into collisions with nearby air molecules, thereby generating additional ions which similarly collide with molecules to create more ions, this action being cumulative. Charges are also released from the surfaces defining the gap by collisions with these surfaces by the moving ions. The travelling ions so produced deposit on the surfaces controlled by the electric field. To reduce the voltage requirements for effecting a field discharge, the web may be prestressed or precharged.

Referring now to FIG. 4, there is shown a PPI radar system employing an electrostatic recording device in accordance with the invention. In a radar system a short burst of radio energy is emitted at a known site and is narrowly beamed in a given direction. Returning pulses reflected from objects within the range of the system and lying in said given direction are received as echoes and detected at the installation site where they are visually displayed. For persistence and continuity of display, the transmitted pulses are periodically repeated at a fixed rate, with sufficient intervening time to allow for the return of echo pulses. The distance from the reflecting object is determined by measuring the time interval between the transmitted pulse and the echo pulse, the velocity of the pulse being known. The pointed direction of the antenna at the time an echo is received is the direction of the echo, thus furnishing a bearing determination as well as a range indication.

In a plan position indication (PPI) radar system, range and bearing are presented as coordinates in polar form. In conventional PPI systems making use of a cathode ray tube, the beam start from the center of the screen at the instant of the transmitted pulse and sweeps radially therefrom at a speed determined by the maximum range to be measured. The radial direction of the sweep corresponds to the true or relative bearing of the antenna. The echo pulse from a reflecting object or target causes a short arc to appear on the cathode-ray screen, the distance from the screen center to the arc giving the range of the target and the angular position of the center of the arc giving the bearing.

As the antenna system rotates, the direction in which the transmitted pulse is radiated changes, and the sweep must rotate on the screen so that its angular direction at all times corresponds to that of the transmitted pulse.

Thus to provide range information, the beam must sweep radially from the center of the screen at a constant velocity, while to provide bearing information the sweep must rotate about the screen center in synchonism with the antenna rotation. In other words, the center of the schreen represents the geographic position of the radar site.

The present invention makes possible an electrostatic PPI indicator which may be used to supplement or replace the conventional cathode-ray beam indicator and which provides a permanent record of range and bearing information. As shown in FIG. 4, in a radar system in accordance with the invention, a master timer or synchronizer acts to control the pulse repetition rate of the system and provides a zero reference point for time measurements and for operation of sequential functions in a definite time relationship. Such timing means may be supplied by a separate unit, such as a multivibrator or blocking oscillator in conjunction with suitable pulse-shaping circuits.

The synchronizer 20 controls the operation of a pulse transmitter 21 which generates pulses of high-frequency electromagnetic wave energy at high power levels.

The output of transmitter 21 is fed to a scanning antenna 22 through an antenna system 23 which includes a transmit-receive switch to prevent transmitted energy from harming the receiver 24 which is also connected to the antenna. The antenna acts to beam and radiate the energy from the transmitter into space and to focus and pick up the returning echo and pass it on to the receiver 24. A suitable drive mechanism 25 is provided for the antenna and serves to rotate the antenna continuously in the azimuthal plane whereby the radar beam scans omnidirectionally in space.

Incoming echo pulses are presented on an electrostatic indicating and recording device, generally designated by numeral 26. The device 26 is constituted by a disc-shaped insulating surface 27 above whose center is pivotally mounted a radial arm 28 which is rotated in synchronism with the rotation of antenna 22 so that the angular position of arm 28 corresponds to the angular orientation of the scanning antenna 22. The synchronous movement of the arm and the antenna may be effected by servo-mechanisms well known in the radar art in connection with deflection yokes for cathode-ray tube.

Mounted along the arm 28 are a plurality of equally spaced point electrodes 29, the electrodes being spaced from the insulating surface in a manner similar to that shown in FIG. 1. The electrodes are connected to the respective outputs of dual-input gating devices 30. One input of each device is connected to a respective stage of a ring counter 31, the other input of each stage being connected to the output of the radar receiver. The ring counter operation is initiated by the master synchronizer 20. The number of point electrodes and associated gating circuits used will depend on the resolution desired, the greater the number per unit of length, the finer the resolution.

Thus, at any given angular position of the radial arm, when a radar pulse is transmitted the operation of the ring counter is simultaneousely initiated and a series of timing pulses are sequentially applied to one input of the gating devices. In the event a target is positioned in space so as to intercept and reflect the transmitted pulse, an echo pulse is received by a receiver 24 at a point in time displaced from the time of transmission by an extent determined by the distance of the target from the radar site. This echo pulse will be applied to the other input of all of the gating devices 30, thereby producing an output pulse in that gating device in which the echo pulse and the timing pulse are coincident. This output pulse is applied to the point electrode 29 associated with the activated gating device to produce a field discharge in the manner discussed in connection with FIG. 1.

The radial position at which the field discharge occurs depends on the angular position of the arm when the echo is received, whereas the position of the field discharge relative to the center of the indicator depends on the time displacement between the transmitted pulse and the echo pulse. Thus as the arm continues to scan the indicator disc, electrostatic charges 30 are formed thereon representative of target positions. In effect a map of reflecting objects could be obtained and if any of the objects were moving their paths would be automatically recorded. The time scale could be changed at will merely be fed into a suitable developing and fixing mechanism.

A continuous developing and fixing process may be carried out by the use of an insulating web which is movable under the rotating radial arm, the web being held stationary for a predetermined recording period and then being shifted to a next recording position. The web may be fed into a suitable developing and firing mechanism.

Direct visualization of the radar image may be had in lieu of a downstream developing station, as above described. This may be accomplished by the use of a magnetic brush developing unit disposed radially on insulating surface 27 and arranged to follow closely behind the recording arm 28. With this arrangement one may visualize the image without the necessity of moving the recording medium to a downstream recording station.

It is to be understood that the invention may also be used with other types of radar indication, such as those based on rectangular coordinates.

In the recording techniques described herein and in the above-mentioned copending application, electrostatic charge images are transferred from raised metal shapes such as alphanumeric characters or point electrodes, to a piece of insulating paper, the charge images being thereafter developed. In accordance with another aspect of the invention, the information may be directly recorded by using the energy involved in the discharge process to trigger off a solid state reaction, as for example, the exothermic detonation of silver acetylide.

Thus, as shown in FIG. 5, the shaped electrode 35 is disposed above and spaced from an insulating medium 36, such as paper, having an upper coat formed of a compound which will react to a field discharge to produce a recognizable indication thereof, thereby eliminating the need for development. The decomposition of the compound under the influence of an electrical discharge from the electrode character will produce a correspondingly shaped area on the treated surface. Other suitable compounds are silver nitrate, silver azide, copper acetylide, mercury and silver fulminates and nitrogen triiodide. If the coating on the medium 36 is itself insulating or semi-conductive, the medium may be conductive or semi-conductive rather than insulating. If on the other hand the coating is conductive then it is desirable that the supporting web be at least semi-conductive.

While there has been shown what are at present considered to be preferred embodiments of the invention, it will be obvious that many changes and modifications may be made therein without departing from the essential scope of the invention. It is intended therefore in the accompanying claims to cover such changes and modifications as fall within the true spirit of the invention.

What is claimed is:

1. Electrostatic apparatus for indicating the elapsed time between two successive information pulses comprising an insulating layer, a plurality of electrostatic discharge electrodes disposed in serial alignment with respect to said layer and spaced apart from said layer to define an air gap therebetween, a like plurality of dual-input gating devices whose respective outputs are connected to said electrodes, means initiated by the first information pulse to supply timing pulses in sequence to one input of each gating device, means to apply said information pulses simultaneously to the other inputs of said devices, each of said gating devices being activated only when a timing pulse and an information pulse is coincident therein thereby to supply an output pulse to the associated electrode having an amplitude sufficient to produce a field discharge in said air gap causing a charge deposit to form on said layer.

2. Electrostatic apparatus for indicating the elapsed time between two successive information pulses comprising an insulating layer, a plurality of electrostatic discharge electrodes arrayed in serial alignment with respect to said layer and spaced apart from said layer to define an air gap therebetween, a time base pulse generator, a multi-stage ring counter coupled to said generator and initiated by a pulse therefrom sequentially to produce timing pulses at the outputs of said stages, a like plurality of dual-input gating devices whose respective outputs are connected to said electrodes, one input of each gating device being coupled to a respective stage of said counter, means to apply said information pulses simultaneously to the other inputs of said devices, and means responsive to the first information pulse to trigger said time base generator whereby said timing pulses are sequentially applied to said electrodes at a time commencing with said first information pulse, each of said gating devices being activated only when a timing pulse and an information pulse is coincident therein thereby to supply an output pulse to the associated electrode having an amplitude sufficient to produce a field discharge in said gap causing a charge deposit to form on said surface.

3. Electrostatic apparatus for indicating and recording the elapsed time between two successive information pulses, said apparatus comprising a web having an electrically insulating surface layer, a plurality of electrostatic discharge electrodes arrayed in serial alignment with respect to said surface and spaced apart from said surface to define an air gap therebetween, a time base pulse generator, a multi-stage ring counter coupled to said generator and initiated by a pulse therefrom to produce in sequence a timing pulse at the output of each stage, a like plurality of dual-input gating devices whose respective outputs are connected to said electrodes, one input of each gating device being coupled to a respective stage of said counter, means to apply said information pulses simultaneously to the other inputs of said devices, means responsive to the first information pulse to trigger said time base generator whereby said timing pulses are applied to said electrodes in sequence at a time commencing with said first information pulse, each of said gating devices being activated only when a timing pulse and an information pulse is coincident therein thereby to supply an output pulse to the associated electrode having an amplitude sufficient to produce a field discharge in said air gap causing a charge deposit to form on said web, and means to develop and fix the charge deposits formed on said web.

4. In a plan position indicator radar system wherein beamed pulses are transmitted by a scanning antenna which is in continuous rotation and wherein echo pulses are received by said antenna from reflecting objects in line with said beam, an electrostatic indicator comprising an insulating layer, an electrode structure including a radial arm rotatable about a point coincident with a center of said layer and bearing a plurality of electrodes arrayed in serial alignment with a line extending radially from said center, said electrodes being spaced from said layer to define an air gap therebetween, means to rotate said arm in synchronism with said scanning antenna, a like plurality of dual-input gating devices whose outputs are connected to respective electrode means initiated by the transmitted pulse to supply timing pulses in sequence to one of said inputs of said devices, and means to supply echo pulses simultaneously to all of the other inputs of said devices to produce an output pulse of the device in which the echo pulse and the timing pulse are coincident, thereby causing a field discharge in said air gap at the electrode associated therewith.

5. An electrostatic direct recording device comprising a web having a coating thereon which is decomposable when subjected to a field discharge, an alphanumeric shaped two dimensional conductive electrode disposed above said web in proximity with said coating to define an air gap therebetween, and means to apply a pulse to said electrode to produce a field discharge in said air gap effecting decomposition of said coating in a region congruent with the shape of said electrode.

6. An electrostatic direct recording device comprising a web having a coating of silver acetylide which is decomposable when subjected to a field discharge, a shaped electrode disposed above said web in proximity with said coating to define an air gap therefrom, and means to apply a pulse to said electrode to produce a field discharge in said air gap effecting decomposition of said coating in a region congruent with the shape of said electrode.

7. An electrostatic direct recording device comprising a web having a coating of silver azide which is decomposable when subjected to a field discharge, a shaped electrode disposed above said web in proximity with said coating to define an air gap therebetween, and means to apply a pulse to said electrode to produce a field discharge in said air gap effecting decomposition of said coating in a region congruent with the shape of said electrode.

8. An electrostatic direct recording device comprising a web having a coating of copper acetylide which is decomposable when subjected to a field discharge, a shaped electrode disposed above said web in proximity with said coating to define an air gap therebetween, and means to apply a pulse to said electrode to produce a field discharge in said air gap effecting decomposition of said coating in a region congruent with the shape of said electrode.

9. An electrostatic direct recording device comprising a web having a coating of mercury and silver fulminates which is decomposable when subjected to a field discharge, a shaped electrode disposed above said web in proximity with said coating to define an air gap therebetween, and means to apply a pulse to said electrode to produce a field discharge in said air gap effecting decomposition of said coating in a region congruent with the shape of said electrode.

10. An electrostatic direct recording device comprising a web having a coating of nitrogen tri-iodide which is decomposable when subjected to a field discharge, a shaped electrode disposed above said web in proximity with said coating to define an air gap therebetween, and means to apply a pulse to said electrode to produce a field discharge in said air gap effecting decomposition of said coating in a region congruent with the shape of said electrode.

References Cited in the file of this patent

UNITED STATES PATENTS

| | | |
|---|---|---|
| 2,059,473 | Metcalf | Nov. 3, 1936 |
| 2,035,475 | Hay | Mar. 31, 1936 |
| 2,467,202 | Gardiner | Apr. 12, 1949 |
| 2,561,345 | Deloraine | July 24, 1951 |
| 2,659,651 | Benno | Nov. 17, 1953 |
| 2,637,024 | Lyman | Apr. 28, 1953 |

UNITED STATES PATENT OFFICE
CERTIFICATE OF CORRECTION

Patent No. 3,091,762                                  May 28, 1963

Frederick A. Schwertz

It is hereby certified that error appears in the above numbered patent requiring correction and that the said Letters Patent should read as corrected below.

Column 5, line 4, for "synchonism" read -- synchronism --; line 6, for "schreen" read -- screen --; line 61, for "simultaneousely" read -- simultaneously --; column 6, line 12, for "be fed into a suitable developing and fixing mechanism" read -- by increasing the repetition rate of the timing pulses --; line 18, for "firing" read -- fixing --; column 7, line 27, after "said" insert -- air --; column 8, line 19, for "therefrom" read -- therebetween --.

Signed and sealed this 3rd day of December 1963.

(SEAL)
Attest:
ERNEST W. SWIDER

Attesting Officer

EDWIN L. REYNOLDS

Acting Commissioner of Patents